United States Patent
Van Kempen et al.

(10) Patent No.: US 8,812,801 B2
(45) Date of Patent: Aug. 19, 2014

(54) METHOD OF DATA REPLICATION IN A DISTRIBUTED DATA STORAGE SYSTEM AND CORRESPONDING DEVICE

(75) Inventors: Alexandre Van Kempen, Cesson Sevigne (FR); Erwan Le Merrer, Cesson Sevigne Cedex (FR); Nicolas Le Scouarnec, Cesson Sevigne (FR)

(73) Assignee: Thomson Licensing (FR)

( * ) Notice: Subject to any disclaimer, the term of this patent is extended or adjusted under 35 U.S.C. 154(b) by 355 days.

(21) Appl. No.: 13/200,021

(22) Filed: Sep. 15, 2011

(65) Prior Publication Data
US 2012/0072689 A1 Mar. 22, 2012

(30) Foreign Application Priority Data
Sep. 20, 2010 (EP) .................................... 10306000

(51) Int. Cl.
G06F 12/16 (2006.01)
G06F 3/06 (2006.01)
H04L 29/08 (2006.01)

(52) U.S. Cl.
CPC ............... G06F 3/067 (2013.01); G06F 3/065 (2013.01); H04L 29/08 (2013.01)
USPC .................................... 711/162; 711/E12.103

(58) Field of Classification Search
None
See application file for complete search history.

(56) References Cited

U.S. PATENT DOCUMENTS

2009/0070337 A1* 3/2009 Romem et al. .................. 707/10

OTHER PUBLICATIONS

Zhi Yang et al: "Exploring the Cost-Availibility Tradeoff in P2P Storage Systems", Parallel Processing 2009. ICPP'09 International Conference on IEEE, Sep. 22, 2009, pp. 429-436.
Jing Tian et al: "Probalistic Failure Detection for Efficient Distributed Storage Maintenance", Reliable Distributed Systems, 2008. SRDS'08 IEEE Symposium on IEEE, Oct. 6, 2008, pp. 147-156.
Chun et al., "Efficient Replica Maintenance for Distributed Storage Systems", 3rd Symposium on Networked Systems and Design Implementation, 2006, pp. 45-58.
EP Search Report dated May 24, 2011, 2 pages.

* cited by examiner

*Primary Examiner* — Denise Tran
(74) *Attorney, Agent, or Firm* — Jack Schwartz and Associates, PLLC

(57) ABSTRACT

A replication set of k storage devices is defined, that stores a particular data item. Each device in the replication set has an associated timer for which a timeout value for disconnection is determined based on individual downtime data distribution of the device. A new device for storing the data item is added to the replication set when the timer expires for a device in the replication set, and if the number of devices in the replication set that are still connected is below a predetermined threshold. Timeout values are adapted according to a factor of criticalness determined for the replication set, resulting in a more reactive, or on the contrary, a less reactive replacement of devices in the replication set. The factor of criticalness is determined according to a difference between the connected devices in the replication set and the predetermined number k.

5 Claims, 4 Drawing Sheets

METHOD OF DATA REPLICATION IN A DISTRIBUTED DATA STORAGE SYSTEM AND CORRESPONDING DEVICE

This application claims the benefit, under 35 U.S.C. §119 of EP Patent Application 10306000.0, filed 20 Sep. 2010.

1. FIELD OF INVENTION

The present invention generally relates to distributed data storage systems. In particular, the present invention relates to optimization of the distributed storage system in terms of number of data replicas needed to ensure a desired level of data replication.

2. TECHNICAL BACKGROUND

With the rapidly spreading deployment of mass data handling devices, such as video and image handling devices, reliable storage of huge amounts of data is required, for direct storage or as part of backup storage. As more and more devices are provided with network connectivity, distributed storage of data in network connected devices is considered as a cost effective solution. In such distributed data storage systems, to ensure data availability and resilience to temporary or permanent data loss, methods have been developed that copy a same item of data to multiple network connected devices in the distributed data storage network. This is called data replication. Data replication has to be taken in a broad sense, and covers mere data duplication as well as usage of coding techniques such as erasure or regenerating codes. To cope with the risk of permanent or temporary data loss due to device failure or device unavailability, a high replication factor (i.e. a high number of copies) is wished. However, to reduce costs in terms of communication and storage size needed (so-called replication costs) it is wished to have a low replication factor.

What is needed is a solution that achieves high level of data availability of distributed data storage that jointly considers resilience to data loss and replication costs.

3. SUMMARY OF THE INVENTION

The present invention aims at alleviating some of the inconveniences of prior art.

In distributed data networks such as peer-to-peer networks, devices join and leave the network continuously. If a device that is part of a distributed data storage network definitively leaves the network, the data replication level decreases. This level of data replication is restored, in data duplication based distributed data storage systems, by creation of a new item of data, copied from available from other still available devices storing the same data item, on a new or existing device in the network. For distributed data storage systems based on erasure- or regenerating codes, the level of data replication is restored by creating a new item of data, the data being generated from other still available devices used for replicating the data item, on a new or existing device in the network. However, a departure of a device is not necessarily definitive, and the unavailability of a device may merely be temporary. The problem is thus how to determine that a device definitively has left the distributed data storage system to trigger, at the appropriate moment, a repair of the level of data replication that has decreased due to the device's departure. If a decreased replication level caused by an only temporary disconnection of a device is restored, the restoring can be considered as having been useless, and has unnecessarily wasted the resources of the distributed data storage network, in terms of storage and in terms of network communication.

When observing the behaviors of devices that are part of a distributed data storage system, it can be observed that devices have their own connectivity behavior. Certain devices are for example always connected, while others are only connected during the day, and disconnected during the night, while still others have a more random connection behavior. Document "Probabilistic Failure Detection for Efficient Distributed Storage Maintenance", JING TIAN et al, Reliable Distributed Systems, 2008, SRDS '08, IEEE symposium, 6 Oct. 2008 mentions that failure detection on a per-node basis is difficult and proposes instead to predict data availability a per group of nodes. But when proceeding as the cited document, when grouping information of individual nodes, information of behavior of the individual nodes in the group is lost and the method described in this prior-art document will thus result in lost efficiency, initiating unnecessary repairs. In contrast with this, the invention makes it possible to exploit knowledge on connectivity behavior of individual devices to determine when devices can be considered as having definitively left the distributed data storage network, and trigger, at the appropriate moment, a new creation of an item of data, in order to use the resources of the distributed data storage network optimally. For this determination, the invention uses a timeout, of which the timeout value is determined as a function of the distribution of the downtime of a device, where the downtime distribution is based on availability behavior that is measured for the device. When a device is disconnected, the timeout is started with a the determined duration. The timeout is reset when the device reconnects before expiration of the timeout. When the timeout duration however expires, the device is considered to be definitively having left the distributed data storage system, and a repair action is started, consisting of restoring the replication level through creation of a new data item, on a new or existing device. The new data item is copied (in the case of data replication based on data duplication) or created—(in the case of data replication based on erasure- or regenerating codes) from one or more of the remaining devices used for storing the a data item. Determination of a fair timeout duration is thus important. With a timeout value that is too short, too many unneeded 'repairs' are done, because temporary disconnections are considered as being permanent disconnections. Many unneeded repairs may cause congestion of the distributed data storage system. If the timeout value is on the contrary too long, data persistence is jeopardized when several permanent disconnections occur before timeout expiration. Therefore, according to the invention, knowledge on the individual connectivity behavior of devices is used in order to determine a timeout duration that is adapted to the connectivity behavior of the individual devices. In the context of the invention, data is gathered relating to the downtime of each device of the distributed data storage system.

In order to optimize data replication in a distributed data storage system, the invention comprises a method of data replication in a distributed data storage system comprising network devices that are at least used as storage devices, the method comprising at least the following steps:

for each storage of a data item, selection of a replication set, the replication set representing a predetermined number k of storage devices in the distributed data storage system that are selected for storing of the data item, the predetermined number k representing a so-called replication level;

for each storage device in the replication set, determination of a timeout value for a timer associated to the storage device that is started upon disconnection of the storage device from the distributed data storage system and that is stopped upon reconnection of the storage device to the distributed data storage system, the storage device being detected as being disconnected upon expiration of the timer, the timeout value being determined as a function of a distribution of downtime data measured for the storage device, the downtime data representing time durations when the storage device was unavailable for the distributed data storage system;

when said at least one storage device is being detected as being disconnected, and if a number of connected storage devices in the replication set is inferior to a predetermined threshold, restoring of said replication level by selection of at least one second storage device new to the replication set, and by creating of a new data item from the data item on the at least one second storage device, and adding of the at least one second storage device to the replication set.

According to a variant embodiment of the invention, the method further comprises a step of reintegration of a storage device in a replication set to which it belongs when the device reconnects to the distributed data storage network after the timer associated to the storage device has expired.

According to a variant embodiment of the invention, the determined timeout value for each of the storage devices in the replication set is adapted according to a factor of criticalness determined for the replication set, the factor of criticalness being determined according to a difference between a number of available devices in the replication set and the replication level.

According to a variant embodiment of the invention, the factor of criticalness is determined according to a difference in a number of connected storage devices in the replication set between two time-spaced measurements of the downtime data.

The invention also concerns a server device for data replication in a distributed data storage system comprising network devices that are at least used as storage devices, the server device comprises means, for each storage of a data item, means for selection of a replication set, the replication set representing a predetermined number k of storage devices in the distributed data storage system that are selected for storing of the data item, the predetermined number k representing a so-called replication level;

for each storage device in the replication set, means for determination (320) of a timeout value for a timer associated to the storage device that is started upon disconnection of the storage device from the distributed data storage system and that is stopped upon reconnection of the storage device to the distributed data storage system, the storage device being detected as being disconnected upon expiration of the timer, the timeout value being determined as a function of a distribution of downtime data measured for the storage device, the downtime data representing time durations when the storage device was unavailable for the distributed data storage system;

when the at least one storage device is being detected as being disconnected (403), and if a number of connected storage devices in the replication set is inferior to a predetermined threshold, means for restoring of the replication level by selection of at least one second storage device new to the replication set, and by creating of a new data item from the data item on the at least one second storage device, and adding of the at least one second storage device to the replication set.

The invention also comprises a computer readable non-transitory storage medium, having instructions that, when executed by a computer, performs the steps of the previously mentioned method of data replication.

4. LIST OF FIGURES

More advantages of the invention will appear through the description of particular, non-restricting embodiments of the invention.

The embodiments will be described with reference to the following figures.

5. DETAILED DESCRIPTION OF THE INVENTION

Figure 1:
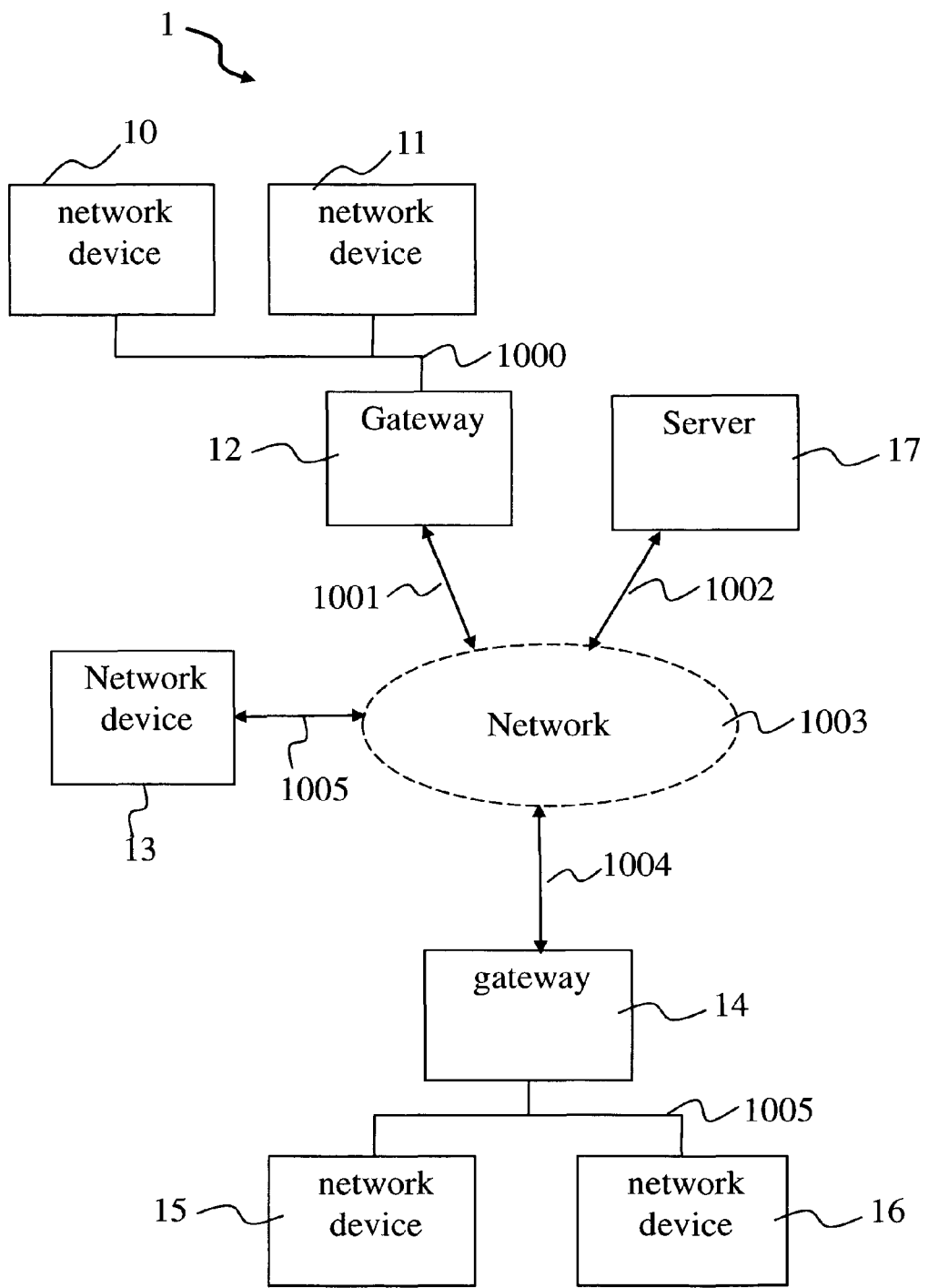
FIG. 1 shows a distributed storage network architecture suited for implementing a particular variant of the invention.

FIG. 1 shows a distributed storage network architecture suited for implementing a particular variant of the invention. The figure shows an network 1003 to which are connected a gateway 12, connecting network devices 10 and 11 to network 1003, a server 17, another gateway 14 which connects network devices 15 and 16 to network 1003, and a network device 13 directly connected to network 1003. All or only some of devices 10-16 can be considered as being distributed storage devices in the distributed storage network according to their capacity to store data and according to membership of the distributed storage network.

Other types of networks than illustrated in FIG. 1 are compatible with the invention. For example, networks comprising one or more network switching nodes or networks comprising one or more subnetworks, and networks connecting wireless network devices.

The invention can be implemented in any type of network device, such as a home gateway connecting a home network to the internet, a web server, a video server, or a wireless device, handheld or not.

Figure 2:
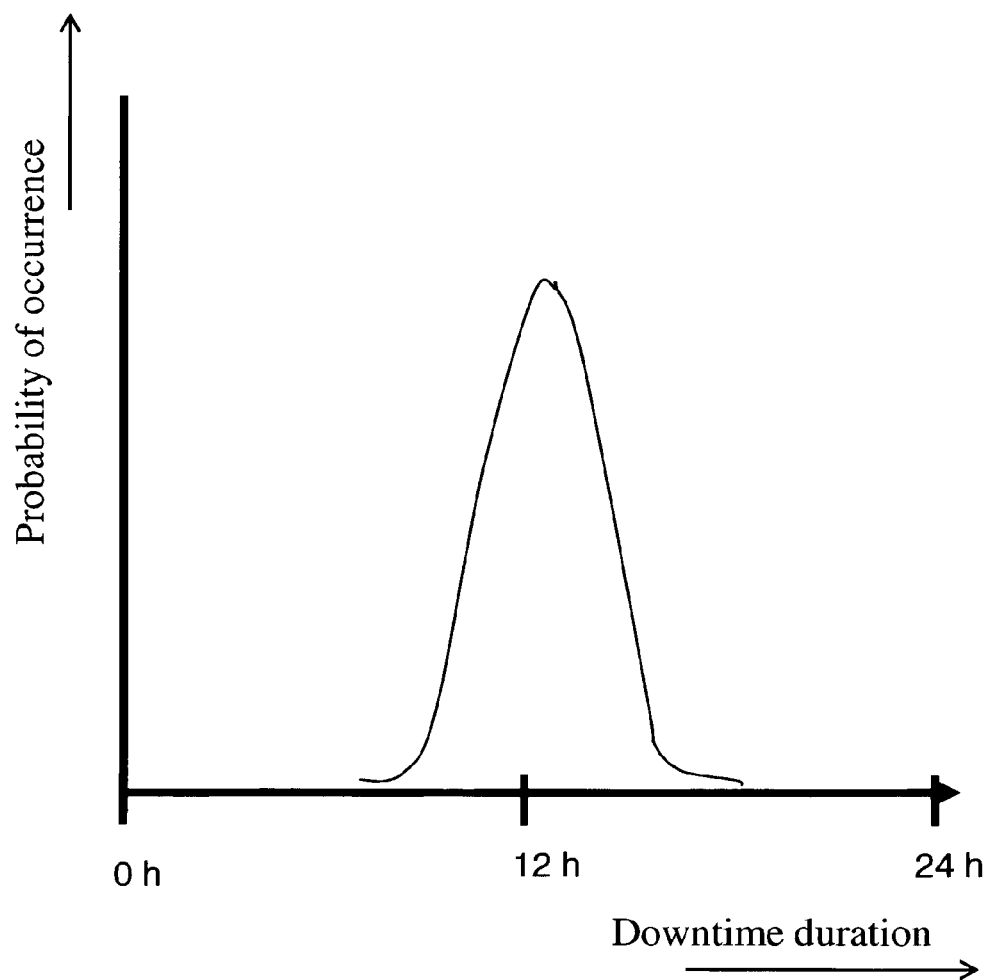
FIG. 2 illustrates a downtime distribution for a typical peer.

FIG. 2 illustrates a downtime distribution for a typical device. As can be seen, the device has a mean downtime of around 13 hours, which is typical for a device that is for example powered down during the night. According to a variant embodiment of the invention, device downtime data is measured individually by each device itself. According to another variant embodiment, the device downtime data is gathered by a centralized server, dedicated or not to this task. According to yet another embodiment, device downtime data is gathered via a monitoring protocol for computation and information exchange, distributing the computational burden for gathering downtime data over the device. Devices that store a same data item form a set of devices or a cluster, that we refer to hereafter as the 'replication set'.

According to a variant embodiment, a notion of criticalness is introduced, which further optimizes the method of the invention. The criticalness is defined as the risk of a permanent loss of a data item, when for example the number of connected devices in a replication set falls under the predetermined replication factor k. The criticalness is determined for all devices in the replication set and influences on the individual value of the timeouts for the devices in the replication set. According to a particular embodiment, the number of connected devices in the replication set directly influences the initial timeout value by means of a factor delta, through the following calculation:

timeoutvalue=*a/c*\*timeout value where a=the observed number of connected devices of the replication set and c=the desired number of connected devices in the replication set. Then, if a>c the factor a/c will be superior to 1 and the timeout value will be increased, which results in a less 'aggressive' timeout setting and thus results in a 'delayed' replacement of disconnected devices in the replication set. If a=c the timeout value is left unchanged. If a<c the timeout is reduced which results in a more 'aggressive' timeout setting and thus a 'accelerated' replacement of disconnected devices in the replication set.

According to a variant embodiment, the criticalness is determined by measuring the number of connected devices in the replication set over time. The initial value of the timeout is reduced, stays the same or is extended according to a factor that is determined based on the decrease or increase of the number of connected devices in the replication set. For example two measurements of connected devices at the same hour for two different weeks.

According to a variant embodiment of the invention, an optimum value for the timeout value is obtained when:

$$\int_{Timeout}^{\infty} \text{Distribution\_downtime} = \frac{\text{Criticalness} \times (1 - P_R(H_0))}{P_R(H_0) \times (1 - \text{Criticalness})} \quad (1)$$

Where criticalness is measured on a scale of 0 to 1, 0 representing minimal criticalness, and 1 representing maximal criticalness, and Pr(H0) is the á priori probability that a timed-out device reconnects. At the system level Pr(H0) could be computed as:

$$Pr(H0) = \frac{NbrTransientFailures}{NbrTransientFailures + NbrPermanentFailures}$$

Where NbrTransientFailures represents the number of 'false' failures, i.e. an unavailability of disconnection of a device that was considered as being unavailable or disconnected (its timeout expired) but that reconnects, and NbrPermanentFailures is the number of 'real' failures, i.e. the device remains unavailable/disconnected.

The value of $$\frac{\text{Criticalness} \times (1 - P_R(H_0))}{P_R(H_0) \times (1 - \text{Criticalness})} \quad (2)$$

is calculated for the replication set. The optimum value of the timeout can be calculated by in a first step calculating the value of the integral, and if this value is inferior to the value of (2), in a second step the timeout value is reduced and the first and second steps are repeated until (1) is true.

According to a variant embodiment, each device stores its own downtime distribution data. This variant has the advantage to avoid centralized monitoring of device availability and reduces communication between devices and the server.

The preceding discussed various embodiments that make adaptation of the timeout on the basis of behavior of individual nodes possible, because it is possible to monitor each node, and store for each node a relatively small amount of data of connections and disconnections. Such monitoring can be achieved by a centralized server that 'pings' each node regularly (ping is a computer network administration utility used to test the reachability of a host on an Internet Protocol (IP) network and to measure the round-trip time for messages sent from the originating host to a destination computer), or in a decentralized way.

Figure 3:
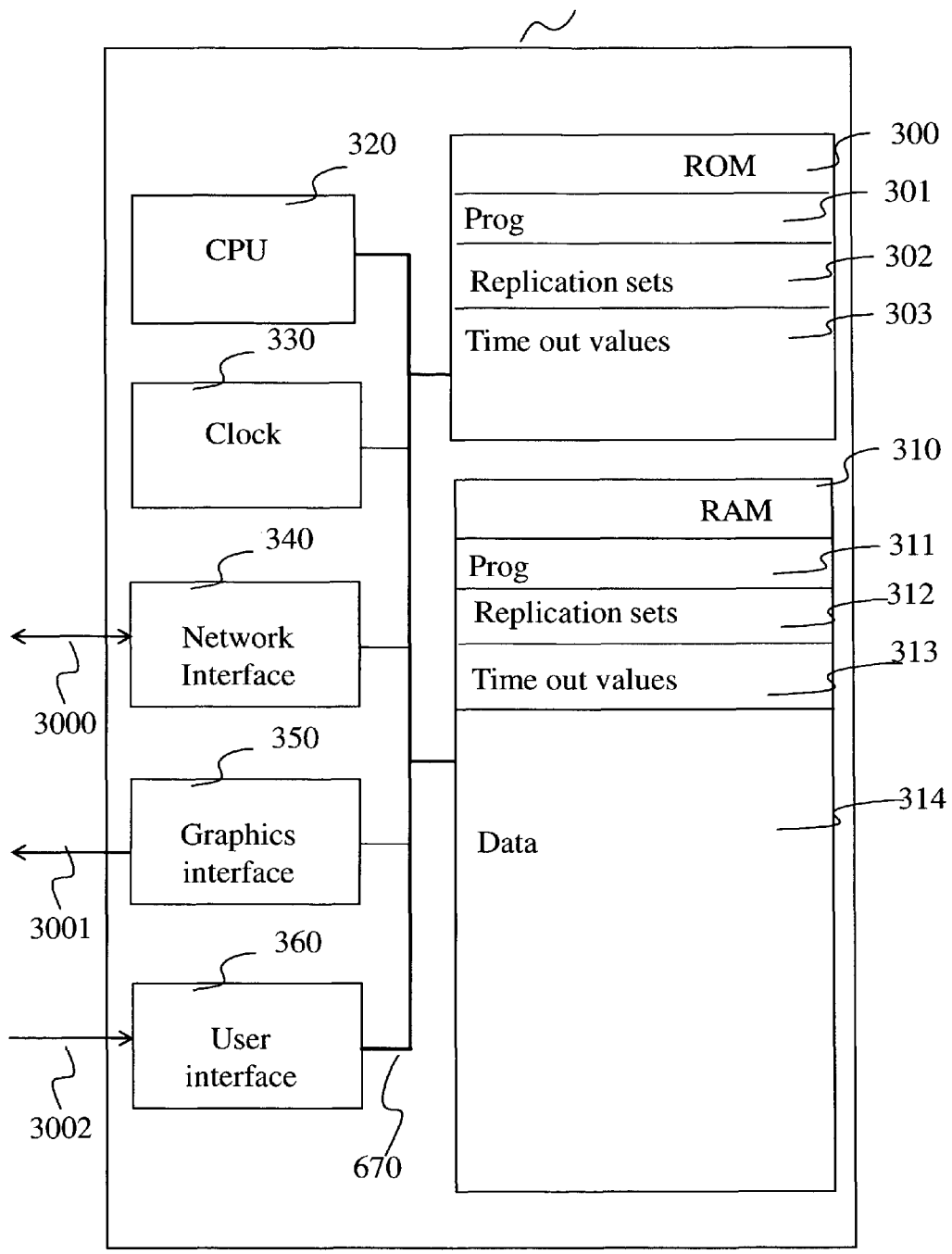
FIG. 3 shows an example embodiment of a device implementing the method of the invention.

FIG. 3 illustrates a device capable of implementing the invention according to a specific embodiment. The device can be a device implementing a particular variant of the invention or a particular centralized device implementing a particular variant of the invention, such as a server, dedicated or not to implementing a particular variant of the invention.

The device 30 comprises a Read-Only Memory (ROM) 300, a Random Access Memory (RAM) 310, a Central Processing Unit (CPU) 320, a clock 330, a network interface 340, a graphics interface 350, and a user interface 360. All of these components are interconnected via a data- and communication bus 370. CPU 320 controls the device 30 according to a program that is stored in ROM 300 in a memory zone 301. Clock device 330 provides the components of device 30 with a common timing in order to sequence and synchronize their operation. Network interface 340 receives and transmits data with external devices via connection 3000. Graphics interface 350 is connected to an external rendering device via connection 3001. User interface 360 receives input commands from a user via connection 3002. ROM memory zone 301 comprises instructions that implement the method of the invention. Upon powering on of device 30, CPU 320 copies the program 'Prog' from ROM memory zone 301 into RAM memory zone 311, and executes the copied program. Upon execution of the copied program, the program allocates memory space for variables needed for its execution in RAM memory zone 315, and copies replication sets 302, and timeout values of timers 303 associated to storage devices in the replication sets into respective RAM memories 312-313. The device 30 is now operational and upon reception of a request for storing of new data, the method of the invention is activated.

According to a variant embodiment, the invention is entirely implemented in hardware, for example as a dedicated component (for example as an ASIC, FPGA or VLSI) (respectively <<Application Specific Integrated Circuit>>, <<Field-Programmable Gate Array>> and <<Very Large Scale Integration>>) or as distinct electronic components integrated in a device or in a form of a mix of hardware and software.

According to a variant embodiment, the invention is implemented as a computer readable medium that performs the method of the invention.

Figure 4:
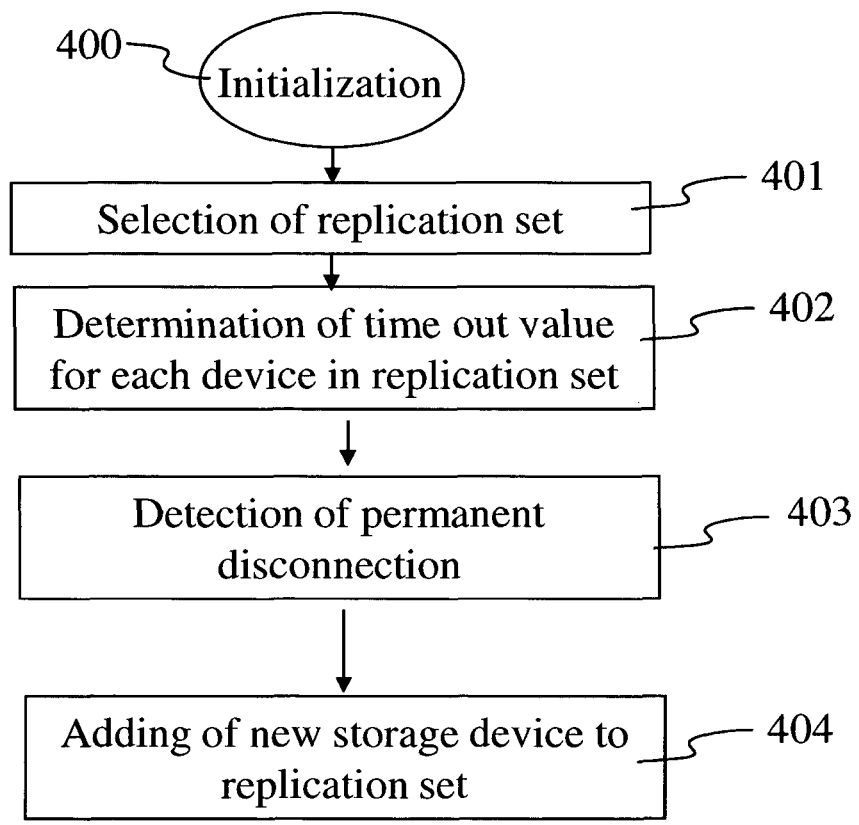
FIG. 4 shows an algorithm implementing a particular embodiment of the method of the invention, implemented for example by one of the devices 10-16 of FIG. 1.

FIG. 4 shows an algorithm implementing a particular embodiment of the method of the invention, implemented for example by the device of FIG. 3.

The algorithm starts with a step 400, where variables needed for its execution are initialized. In a step 401, a replication set is selected for a storage of a data item. This selection is for example done by CPU 320 of FIG. 3. Such a replication set represents a predetermined number, for example k, of storage devices in the distributed data storage system that are selected for storing the data item. The selection of the replication set is for example triggered upon reception of a request to store the data item. The number k is predetermined, and is set to a value that ensures data resilience. The predetermined number k is also further referred to as 'replication level'. Then, in a step 402, a timeout value is determined for timers associated to the devices in the replication set, each device being associated to a particular timer. This determination is for example done by CPU 320 of FIG.

3. The timer allows to determine a permanent disconnection or unavailability of a device in the replication set. The timers are started upon disconnection of the associated storage device and are stopped upon reconnection of the associated storage device. If the timer however expires, the associated storage device is considered as being disconnected from the distributed storage system. The timeout value is determined as a function of the distribution of the downtime data measured for the storage device associated to the timeout. The downtime data represents time durations when the storage device was unavailable/disconnected from the distributed data storage system. In a step 403, when the at least one storage device in a replication set is being detected as being disconnected, and if a number of connected/available storage devices in the replication set is inferior to a predetermined threshold (for example k, but can also be higher than k to add a security margin), the replication level is restored by selection of at least one storage device new to the replication set, and a new data item is created from the data item and then stored on the 'new' storage device, and the 'new' storage device is added to the replication set. The restoring of the replication level is for example done by CPU 320 of FIG. 3.

The method can be further optimized by reintegration of a storage device in a replication set to which it belongs when the storage device reconnects to the distributed data storage network after its associated timer has expired, i.e. it was 'falsely' considered as being permanently disconnected.

According to a variant embodiment, the determined timeout value for each of the storage devices in the replication set is adapted according to a factor of criticalness determined for the replication set, the factor of criticalness being determined according to a difference between a number of available devices in the replication set and the predetermined number k.

The adaptive and lazy approach for replica repairs according to the method of the invention is unique in that it not only does use per node timeouts, but adapts aggressiveness of replication over time. If the timeout is too short and there are too many replicas, the timeout is lengthened until equilibrium is met. And if the timeout is too long, the timeout is shortened in order to increase the number of replicas to the minimum required. This lazy approach significantly reduces the amount of resources used over time since it lowers the amount of false-positive decisions of permanent node loss.

The invention claimed is:

1. A method of data replication in a distributed data storage system comprising network devices that are at least used as storage devices, wherein said method comprising:
for each storage of a data item, selection of a replication set, said replication set representing a predetermined number k of storage devices in said distributed data storage system that are selected for storing of said data item, said predetermined number k representing a so-called replication level;
for each storage device in said replication set, referred to as replication storage device, determination of a timeout value for a timer associated to said replication storage device, that is started upon disconnection of said replication storage device from said distributed data storage system and that is stopped upon reconnection of said replication storage device to said distributed data storage system, said replication storage device being detected as being disconnected upon expiration of said timer, said timeout value being determined as a function of a distribution of downtime data measured for said replication storage device, said downtime data representing time durations when said replication storage device was unavailable for said distributed data storage system;
when said replication storage device is being detected as being disconnected, and if a number of connected replication storage devices in said replication set is inferior to a predetermined threshold, restoring of said replication level by selection of at least one second storage device new to said replication set, and by creating of a new data item from said data item on said at least one second storage device, and adding of said at least one second storage device to said replication set; and
adapting said timeout value according to a factor of criticalness determined for said replication set, said factor of criticalness being determined according to a difference between said number of connected replication storage devices in said replication set and said replication level.

2. A method according to claim 1, wherein said method further comprises a step of reintegration of a replication storage device being detected as being disconnected in a replication set to which it belongs when the replication storage device reconnects to said distributed data storage network after said timer associated to the replication storage device has expired.

3. A method according to claim 2, wherein said factor of criticalness is determined according to a difference in a number of connected replication storage devices in said replication set between two time-spaced measurements of said downtime data.

4. A server device for data replication in a distributed data storage system comprising network devices that are at least used as storage devices, wherein said server device comprises the following means:
for each storage of a data item, means for selection of a replication set, said replication set representing a predetermined number k of storage devices in said distributed data storage system that are selected for storing of said data item, said predetermined number k representing a so-called replication level;
for each storage device in said replication set, referred to as replication storage device, means for determination of a timeout value for a timer associated to said replication storage device that is started upon disconnection of said replication storage device from said distributed data storage system and that is stopped upon reconnection of said replication storage device to said distributed data storage system, said replication storage device being detected as being disconnected upon expiration of said timer, said timeout value being determined as a function of a distribution of downtime data measured for said replication storage device, said downtime data representing time durations when said replication storage device was unavailable for said distributed data storage system;
when said replication storage device is being detected as being disconnected, and if a number of connected replication storage devices in said replication set is inferior to a predetermined threshold, means for restoring of said replication level by selection of at least one second storage device new to said replication set, and by creating of a new data item from said data item on said at least one second storage device, and adding of said at least one second storage device to said replication set; and
means for adapting said timeout value according to a factor of criticalness determined for said replication set, said factor of criticalness being determined according to a difference between said number of connected replication storage devices in said replication set and said replication level.

5. A computer readable non-transitory storage medium having instructions, which, when executed by a computer, performs the steps of:

for each storage of a data item, selection of a replication set, said replication set representing a predetermined number k of storage devices in said distributed data storage system that are selected for storing of said data item, said predetermined number k representing a so-called replication level;

for each storage device in said replication set, referred to as replication storage device, determination of a timeout value for a timer associated to said replication storage device that is started upon disconnection of said replication storage device from said distributed data storage system and that is stopped upon reconnection of said replication storage device to said distributed data storage system, said replication storage device being detected as being disconnected upon expiration of said timer, said timeout value being determined as a function of a distribution of downtime data measured for said replication storage device, said downtime data representing time durations when said replication storage device was unavailable for said distributed data storage system;

when said replication storage device is being detected as being disconnected, and if a number of connected replication storage devices in said replication set is inferior to a predetermined threshold, restoring of said replication level by selection of at least one second storage device new to said replication set, and by creating of a new data item from said data item on said at least one second storage device, and adding of said at least one second storage device to said replication set; and adapting said determined timeout value according to a factor of criticalness determined for said replication set, said factor of criticalness being determined according to a difference between said number of connected replication storage devices in said replication set and said replication level.

\* \* \* \* \*